(12) United States Patent
Shibata et al.

(10) Patent No.: US 7,037,733 B2
(45) Date of Patent: May 2, 2006

(54) METHOD FOR MEASURING TEMPERATURE, ANNEALING METHOD AND METHOD FOR FABRICATING SEMICONDUCTOR DEVICE

(75) Inventors: Satoshi Shibata, Toyama (JP); Junji Hirase, Osaka (JP); Tatsuo Sugiyama, Osaka (JP); Emi Kanasaki, Toyama (JP); Fumitoshi Kawase, Toyama (JP); Yasushi Naito, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 274 days.

(21) Appl. No.: 10/343,762

(22) PCT Filed: Jul. 1, 2002

(86) PCT No.: PCT/JP02/06655

§ 371 (c)(1),
(2), (4) Date: Feb. 4, 2003

(87) PCT Pub. No.: WO03/038384

PCT Pub. Date: May 8, 2003

(65) Prior Publication Data
US 2004/0023421 A1 Feb. 5, 2004

(30) Foreign Application Priority Data
Oct. 30, 2001 (JP) ............................. 2001-332217

(51) Int. Cl.
*H01L 21/66* (2006.01)
*G01N 25/00* (2006.01)
*G01J 5/00* (2006.01)

(52) U.S. Cl. .................... 438/11; 438/14; 438/18; 438/22; 438/28; 438/39; 438/35; 374/9; 374/126; 374/129

(58) Field of Classification Search ............... 374/9, 374/126, 128
See application file for complete search history.

(56) References Cited

U.S. PATENT DOCUMENTS 4,764,026 A * 8/1988 Powell et al. ............... 374/178
4,919,542 A * 4/1990 Nulman et al. ............... 374/9

(Continued)

FOREIGN PATENT DOCUMENTS

JP 10-321539 12/1998

(Continued)

OTHER PUBLICATIONS

Hong, Xiao, "Introduction to Semiconductor Manufacturing Technology." Prentice Hall, Copyright 2001, ISBN 0-13-022404-9, pp. 6 total.

(Continued)

Primary Examiner—Carl Whitehead, Jr.
Assistant Examiner—James M. Mitchell
(74) Attorney, Agent, or Firm—McDermott Will & Emery LLP

(57) ABSTRACT

When the emissivity $\epsilon$ on the reverse face of a substrate 10 is measured during annealing processing for the substrate 10, films made from a material that varies the emissivity $\epsilon$, such as a first DPS film 15 used for forming a plug 15A, a second DPS film 17 used for forming a capacitor lower electrode 17A and a third DPS film 20 used for forming a capacitor upper electrode 20A, are formed on the top face of the substrate 10. On the other hand, no film made from a material that varies the emissivity $\epsilon$, such as a DPS film, is formed on the reverse face of the substrate 10.

14 Claims, 10 Drawing Sheets

U.S. PATENT DOCUMENTS

| | | | | |
|---|---|---|---|---|
| 5,114,242 A | * | 5/1992 | Gat et al. | 374/128 |
| 5,156,461 A | * | 10/1992 | Moslehi et al. | 374/121 |
| 5,296,385 A | * | 3/1994 | Moslehi et al. | 438/514 |
| 5,439,850 A | * | 8/1995 | Ozturk et al. | 438/488 |
| 5,504,637 A | * | 4/1996 | Asada et al. | 360/98.07 |
| 5,624,590 A | * | 4/1997 | Fiory | 219/390 |
| 5,765,540 A | * | 6/1998 | Ishii et al. | 123/520 |
| 5,814,365 A | * | 9/1998 | Mahawili | 427/10 |
| 5,900,177 A | | 5/1999 | Lecouras et al. | |
| 6,166,354 A | * | 12/2000 | Hause et al. | 219/390 |
| 6,177,127 B1 | * | 1/2001 | Weimer et al. | 427/8 |
| 6,179,466 B1 | * | 1/2001 | Peuse et al. | 374/126 |
| 6,200,634 B1 | | 3/2001 | Johnsgard et al. | |
| 6,374,150 B1 | * | 4/2002 | Redinbo et al. | 700/121 |
| 2001/0014111 A1 | | 8/2001 | Shimizu | |
| 2001/0044182 A1 | * | 11/2001 | Sakoh et al. | 438/255 |

FOREIGN PATENT DOCUMENTS

JP     11-80953     3/1999

OTHER PUBLICATIONS

Oh, Minseok., et al. "Impact of Emissivity-Independent Temperature Control in Rapid Thermal Processing." Ra[id Thermal and Integrated Processing Symposium, vol. 470, Apr. 1, 1997, pp. 43-48.

* cited by examiner (a)

(b)

(c)

(a)

(b)

(a)

(b)

(a)

(b)

(a)

|  |  | Thickness (nm) | Sample A | Sample B | Sample C |
|---|---|---|---|---|---|
| 50 | Silicon substrate | – | ○ | ○ | ○ |
| 51 | $SiO_2$ | 3 | ○ | ○ | ○ |
| 52 | Polysilicon | 200 | ○ | ○ | ○ |
| 53 | TEOS | 20 | ○ | ○ | ○ |
| 54 | DPS1 | 250 | ○ | ○ | × |
| 55 | SiN | 50 | ○ | ○ | ○ |
| 56 | DPS2 | 100 | ○ | × | × |

(b)

[Sample A]

(c)

[Sample B]

(d)

[Sample C]

(a)

[Relationship between annealing time and emissivity ε in samples A, B and C]

(b)

[Relationship between annealing time and emissivity ε in Samples B1 – B5]

METHOD FOR MEASURING TEMPERATURE, ANNEALING METHOD AND METHOD FOR FABRICATING SEMICONDUCTOR DEVICE

TECHNICAL FIELD

The present invention relates to a method for accurately measuring a temperature of an object such as a substrate by measuring the emissivity of the object, and more particularly, it relates to an annealing method in which an object is annealed at an accurate temperature on the basis of the emissivity of the object.

BACKGROUND ART

FIG. 9 schematically shows the cross-sectional structure of a conventional annealing system, and specifically, a furnace type annealing system (a hot wall type annealing system).

The annealing system 100 of FIG. 9 includes a vertical furnace 101 of SiC and a coil 102 coiled around the side face of the furnace 101. The inside of the furnace 101 is heated with the coil 102 and kept at a predetermined temperature. Specifically, a temperature gradient is formed in a thermal region Rth within the furnace 101, and for example, the temperature of an upper portion of the thermal region Rth is set to a relatively high temperature of, for example, 1050° C., and the temperature of a lower portion of the thermal region Rth is set to a relatively low temperature of, for example, 850° C.

The annealing system 100 further includes a table 103 for placing a substrate 10 to be annealed and a support 104 for supporting and vertically moving the table 103. The substrate 10 can be held in an arbitrary position within the thermal region Rth by vertically moving the table 103, so that the substrate 10 can be annealed at a desired temperature. FIG. 9 shows a state where the table 103 is in an initial position H0 employed before starting the annealing of the substrate 10. Also, the table 103 holds the substrate 10 so that the reverse face of the substrate 10 can be partially exposed.

The annealing system 100 further includes a cover 105 for housing the furnace 101, the coil 102 and the table 103, and a substrate inlet/outlet 106 provided on the cover 105. Specifically, the substrate 10 inserted into the cover 105 through the substrate inlet/outlet 106 is placed on the table 103 so as to be annealed at a desired temperature in the thermal region Rth. The end of the support 104 opposing the table 103 extends to the outside of the cover 105.

In order to find out the temperature of the substrate 10 being annealed, it is necessary to measure the emissivity (thermal emissivity) $\epsilon$ and the pyrometer intensity (radiance) I of the substrate 10 as described later. For this purpose, a photoirradiation section 107 for irradiating the reverse face of the substrate 10 placed on the table 103 with measuring light of a predetermined wavelength is provided on the bottom of the cover 105, and a measuring section 108 for measuring the emissivity $\epsilon$ and the pyrometer intensity I on the reverse face of the substrate 10 is provided outside the cover 105 below the support 104.

Now, the reason why the temperature T can be obtained on the basis of the emissivity $\epsilon$ and the pyrometer intensity I will be described. In general, the pyrometer intensity I of a blackbody is represented by the following formula 1 on the basis of Planck's formula of radiation:

$$I(T, \lambda) = 2\pi C1/\lambda^5 \cdot (\exp((C2/(\lambda T)) - 1))$$  Formula 1

As shown in formula 1, the pyrometer intensity I of a blackbody is a function of the temperature T of the blackbody and the wavelength $\lambda$ of the measuring light. In other words, the pyrometer intensity I is varied in accordance with the temperature T and the wavelength $\lambda$. In formula 1, C1 and C2 are constants.

Also, the pyrometer intensity I of a general object (non-blackbody) is represented by the following formula 2 using the emissivity $\epsilon$ of the object:

$$I(T, \lambda) = \epsilon(T, \lambda) \cdot 2\pi C1/\lambda^5 \cdot (\exp((C2/(\lambda T)) - 1))$$  Formula 2

As shown in formula 2, the emissivity $\epsilon$ is also a function of the temperature T of the object and the wavelength $\lambda$ of the measuring light. Accordingly, in the case where the wavelength $\lambda$ has a specific value, the temperature T is a function of the emissivity $\epsilon$ and the pyrometer intensity I, which is represented by the following formula 3:

$$T = f(\epsilon \text{(emissivity)}, I \text{ (pyrometer intensity)})$$  Formula 3

As shown in formula 3, the actual temperature T of an object being annealed can be obtained by measuring the emissivity $\epsilon$ and the pyrometer intensity I. In formula 3, f indicates a function (temperature measurement function) having variables $\epsilon$ and I. Also, in the case where the measuring light irradiating an object is entirely reflected by the object, the emissivity $\epsilon$ of the object is 0, and in the case where the measuring light irradiating an object is entirely absorbed by the object (namely, in the case where the object is a blackbody), the emissivity $\epsilon$ of the object is 1. In other words, when the reflectance of the measuring light is r, $\epsilon = 1 - r$. Accordingly, instead of directly measuring the emissivity $\epsilon$, the reflectance r can be measured so as to indirectly measure the emissivity $\epsilon$ by using the measured reflectance r.

As described above, in the annealing system 100 of FIG. 9, the whole thermal region Rth of the furnace 101 does not have a uniform temperature but the temperature gradient is formed in the thermal region Rth. Specifically, the temperature is higher toward the upper portion of the furnace 101. Accordingly, in order to anneal the substrate 10 at a desired temperature, the position within the furnace 101 in which the substrate 10 is held by using the table 103 and the support 104 is significant. At this point, for feedback control of the annealing temperature for the substrate 10, it is necessary to measure the emissivity $\epsilon$ and the pyrometer intensity I, so as to obtain the temperature of the substrate 10 being annealed on the basis of the measurement result. In the conventional technique, however, it is difficult to accurately obtain the temperature of the substrate 10 being annealed.

DISCLOSURE OF THE INVENTION

In consideration of the above, an aim of the invention is accurately measuring the temperature of an object being annealed, so that annealing can be performed on the object at an accurate temperature.

In order to achieve the object, the present inventors have performed comparative experiments for measuring the emissivities $\epsilon$ during annealing of a variety of experiment samples in each of which a plurality of films of various materials are stacked on a substrate.

FIG. 10(a) shows the film structures (materials and thicknesses of the respective films) of the respective experiment samples (samples A, B and C), and FIGS. 10(b) through 10(d) respectively show the cross-sectional structures of the samples A, B and C.

As shown in FIG. 10(b), the sample A includes a silicon substrate 50; a silicon oxide film ($SiO_2$ film) 51 formed on the silicon substrate 50; a nondoped polysilicon film 52 formed on the $SiO_2$ film 51; a silicon oxide film (TEOS oxide film) 53 formed on the polysilicon film 52 by using TEOS (tetra ethyl ortho silicate); a phosphorus-doped polysilicon film (first DPS (Doped Poly-Silicon) film) 54 formed on the TEOS oxide film 53; a silicon nitride film (SiN film) 55 formed on the first DPS film 54; and a phosphorus-doped polysilicon film (second DPS film) 56 formed on the SiN film 55.

Also, as shown in FIG. 10(c), the sample B includes a silicon substrate 50; a $SiO_2$ film 51 formed on the silicon substrate 50; a nondoped polysilicon film 52 formed on the $SiO_2$ film 51; a TEOS oxide film 53 formed on the polysilicon film 52; a first DPS film 54 formed on the TEOS oxide film 53; and a SiN film 55 formed on the first DPS film 54. Specifically, the sample B does not include the second DPS film 56.

Furthermore, as shown in FIG. 10(d), the sample C includes a silicon substrate 50; a $SiO_2$ film 51 formed on the silicon substrate 50; a nondoped polysilicon film 52 formed on the $SiO_2$ film 51; a TEOS oxide film 53 formed on the polysilicon film 52; and a SiN film 55 formed on the TEOS oxide film 53. Specifically, the sample C includes neither the first DPS film 54 nor the second DPS film 56.

As shown in FIG. 10(a), the $SiO_2$ film 51 has a thickness of 3 nm, the polysilicon film 52 has a thickness of 200 nm, the TEOS oxide film 53 has a thickness of 20 nm, the first DPS film 54 has a thickness of 250 nm, the SiN film 55 has a thickness of 50 nm, and the second DPS film 56 has a thickness of 100 nm.

FIG. 11(a) shows the relationships between the annealing time (specifically, time elapsed from the start of annealing) and the emissivity $\epsilon$ obtained with respect to the samples A, B and C. In FIG. 11(a), the abscissa indicates the annealing time and the ordinate indicates the emissivity $\epsilon$. In this case, the emissivity $\epsilon$ is measured by irradiating the substrate top face (i.e., the principal plane on which the multilayered film of the various materials is formed) of each sample with light of a predetermined wavelength. Also, the annealing temperature for each sample is 1000 degrees. As shown in FIG. 11(a), it is understood that the emissivity $\epsilon$ is largely varied with the annealing time in the sample A (including the two DPS films) and the sample B (including the one DPS film). On the contrary, it is understood from FIG. 11(a) that the emissivity $\epsilon$ is minimally varied with the annealing time in the sample C (including no DPS film). It is found from this result that the emissivity $\epsilon$ is varied due to the presence of a DPS film in the sample.

Also in the sample C shown in FIG. 11(a), the emissivity $\epsilon$ is not constant but slightly varied. As described later, when a measurement error occurs in the emissivity $\epsilon$, an error also occurs in the temperature obtained on the basis of the emissivity $\epsilon$. However, the variation in the emissivity $\epsilon$ as that of the sample C, and specifically, variation in the emissivity $\epsilon$ with a variation coefficient F of 5% or less, does not lead to a serious temperature error. In other words, it can be said that the emissivity $\epsilon$ is not substantially varied in the sample C. At this point, the variation coefficient $F=(\epsilon_{max}$ (the maximum value of the emissivity $\epsilon)-\epsilon_{min}$ (the minimum value of the emissivity $\epsilon$))/$\epsilon_{max}$. Accordingly, in the description and claims of the present invention, "to vary the emissivity $\epsilon$" means "to substantially vary the emissivity $\epsilon$" (for example, to vary the emissivity $\epsilon$ to an extent where the variation coefficient F exceeds 5%).

FIG. 11(b) shows the relationships between the annealing time and the emissivity $\epsilon$ obtained with respect to a plurality of samples B (samples B1, B2, B3, B4 and B5) fabricated under the conditions shown in FIG. 10(a). Also in FIG. 11(b), the abscissa indicates the annealing time and the ordinate indicates the emissivity $\epsilon$. In this case, the method for measuring the emissivity $\epsilon$ and the annealing temperature for each sample are the same as those employed in FIG. 11(a). As shown in FIG. 11(b), in the case where each sample includes a DPS film, the variation in the emissivity $\epsilon$ with the annealing time is completely different even among the samples fabricated under the same conditions (such as the materials and the thicknesses of the films).

Specifically, as a result of the comparative experiments made by the present inventors, it was found that different measured values of the emissivity $\epsilon$ may be obtained even in measuring the emissivity $\epsilon$ of the same object. Accordingly, it was found that in the case where a material that varies the emissivity $\epsilon$ with the annealing time, such as a DPS film, is included as in the samples A and B, the emissivity $\epsilon$ cannot be accurately measured unless the material is removed before measuring the emissivity $\epsilon$. Also, not only in the case where the light used for measuring the emissivity $\epsilon$ (measuring light) directly irradiates the DPS film (the second DPS film 56) as in the sample A, namely, in the case where the DPS film is present in the uppermost portion, but also in the case where the DPS film (the first DPS film 54) is covered with the film of another material (the SiN film 55) as in the sample B, the emissivity $\epsilon$ is varied. Accordingly, it is necessary to remove, before measuring the emissivity $\epsilon$, all DPS films formed on the principal plane of the substrate that is irradiated with the measuring light.

In each of the samples A and B, not all the films cause the variation in the emissivity $\epsilon$ with the annealing time but some films such as the $SiO_2$ film and the SiN film are not concerned with the variation in the emissivity $\epsilon$. Also, the reason why the emissivity $\epsilon$ is varied by a DPS film is presumed to be because the physical properties of the DPS film, such as the grain size, are changed through the annealing. Furthermore, the reason why the variation in the emissivity $\epsilon$ is different among the samples B1 through B5 fabricated under the same conditions is presumed to be because the grain size is changed differently among the samples.

As described so far, in order to accurately measure the emissivity $\epsilon$ of an object being annealed, it is necessary to previously remove a material that varies the emissivity $\epsilon$. At this point, in an annealing system, such as the annealing system 100 of FIG. 9, in which the temperature T of an object to be annealed (specifically, the substrate 10) is obtained by measuring the emissivity $\epsilon$ and the pyrometer intensity I thereof so as to control the temperature T, namely, the annealing temperature on the basis of the resultant temperature, a measurement error of the emissivity $\epsilon$ directly leads to an error in the temperature T. Specifically, assuming that the measurement error of the emissivity $\epsilon$ is $\Delta\epsilon$ and the error in the temperature T is $\Delta T$, the relationship between the errors $\Delta\epsilon$ and $\Delta T$ can be represented by the following formula 4 on the basis of formula 2:

$$\Delta T = T^2 \cdot \lambda \cdot \Delta\epsilon/(C1 \cdot \epsilon) \qquad \text{Formula 4}$$

As shown in formula 4, as the measurement error $\Delta\epsilon$ of the emissivity $\epsilon$ is larger, the error $\Delta T$ in the temperature T is larger. Accordingly, in order to perform annealing on an object at an accurate temperature by using the annealing system as shown in FIG. 9, it is indispensable to accurately measure the emissivity $\epsilon$ by grasping the state during the annealing of a plane of the object for measuring the emissivity $\epsilon$ (specifically, the reverse face of the substrate 10 irradiated with the measuring light) and by previously removing a material that varies the emissivity $\epsilon$ with time from at least the plane irradiated with the measuring light, so that the temperature T of the object can be accurately obtained.

The present invention was devised on the basis of the aforementioned finding, and specifically, the first method for measuring emissivity of this invention includes a step of measuring emissivity $\epsilon$ of an object, while annealing the object having a first face and a second face, by irradiating the second face with measuring light of a given wavelength, and in the step of measuring emissivity $\epsilon$, a film of a material that varies the emissivity $\epsilon$ is formed on the first face and no film of the material is formed on the second face.

In the first method for measuring emissivity, since the emissivity $\epsilon$ of an object is measured in a state where a film of a material causing variation in the emissivity $\epsilon$ is not present on the second face of the object corresponding to a face irradiated with the measuring light, and therefore, the emissivity $\epsilon$ of the object can be prevented from varying during the annealing, resulting in accurately measuring the emissivity $\epsilon$.

In the first method for measuring emissivity, the step of measuring emissivity $\epsilon$ may include a step of measuring reflectance r on the second face of the object for measuring the emissivity $\epsilon$ by using the measured reflectance r.

The second method for measuring emissivity of this invention includes a step of measuring emissivity $\epsilon$ of an object, while annealing the object having a first face and a second face, by irradiating the second face with measuring light of a given wavelength, and in the step of measuring emissivity $\epsilon$, doped polysilicon is formed on the first face and no doped polysilicon is formed on the second face.

In the second method for measuring emissivity, the emissivity $\epsilon$ of the object is measured in a state where doped polysilicon is not present on the second face of the object corresponding to a face irradiated with the measuring light, and therefore, the emissivity $\epsilon$ of the object can be prevented from varying during the annealing, resulting in accurately measuring the emissivity $\epsilon$.

In the second method for measuring emissivity, the step of measuring emissivity $\epsilon$ may include a step of measuring reflectance r on the second face of the object for measuring the emissivity $\epsilon$ by using the measured reflectance r.

The first method for measuring a temperature of this invention includes the steps of measuring, while annealing an object having a first face and a second face, emissivity $\epsilon$ on the second face of the object; and calculating a temperature of the object being annealed on the basis of the measured emissivity $\epsilon$, and in the step of measuring emissivity $\epsilon$, a film of a material that varies the emissivity $\epsilon$ is formed on the first face and no film of the material is formed on the second face.

In the first method for measuring a temperature, the emissivity $\epsilon$ on the second face of the object is measured in a state where a film of a material causing variation in the emissivity $\epsilon$ is not present on the second face, and the temperature of the object being annealed is calculated on the basis of the measured emissivity $\epsilon$. Therefore, the emissivity $\epsilon$ of the object can be prevented from varying during the annealing, so as to accurately measure the emissivity $\epsilon$. As a result, on the basis of the measured emissivity $\epsilon$, for example, by substituting the measured value of the emissivity $\epsilon$ in the temperature measurement function (see formula 3), the temperature of the object being annealed can be accurately obtained.

In the first method for measuring a temperature, the step of measuring emissivity $\epsilon$ may include a step of measuring reflectance r on the second face of the object for measuring the emissivity $\epsilon$ by using the measured reflectance r.

The second method for measuring a temperature of this invention includes the steps of measuring, while annealing an object having a first face and a second face, emissivity $\epsilon$ on the second face of the object; and calculating a temperature of the object being annealed on the basis of the measured emissivity $\epsilon$, and in the step of measuring emissivity $\epsilon$, doped polysilicon is formed on the first face and no doped polysilicon is formed on the second face.

In the second method for measuring a temperature, the emissivity $\epsilon$ on the second face of the object is measured in a state where doped polysilicon is not present on the second face, and the temperature of the object being annealed is calculated on the basis of the measured emissivity $\epsilon$. Therefore, the emissivity $\epsilon$ of the object can be prevented from varying during the annealing, so as to accurately measure the emissivity $\epsilon$. As a result, on the basis of the measured emissivity $\epsilon$, for example, by substituting the measured value of the emissivity $\epsilon$ in the temperature measurement function (see formula 3), the temperature of the object being annealed can be accurately obtained.

In the second method for measuring a temperature, the step of measuring emissivity $\epsilon$ may include a step of measuring reflectance r on the second face of the object for measuring the emissivity $\epsilon$ by using the measured reflectance r.

The annealing method of this invention for performing annealing on a substrate by using an annealing system including a substrate placing section, a heating section for annealing the substrate placed on the substrate placing section and a measuring section for measuring emissivity $\epsilon$ of the substrate placed on the substrate placing section, includes the steps of measuring the emissivity $\epsilon$ on a reverse face of the substrate with the measuring section while placing the substrate on the substrate placing section in a state where a film of a material that varies the emissivity $\epsilon$ is formed on a top face of the substrate and where no film of the material is formed on the reverse face of the substrate and while annealing the substrate with the heating section; and performing the annealing on the substrate while controlling an annealing temperature for the substrate on the basis of the measured emissivity $\epsilon$.

In the annealing method of this invention, the emissivity $\epsilon$ on the substrate reverse face is measured in a state where a film of a material causing the variation in the emissivity $\epsilon$ is not present on the substrate reverse face, and the annealing is performed on the substrate while controlling the annealing temperature on the basis of the measured emissivity $\epsilon$. Therefore, the emissivity $\epsilon$ of the substrate can be prevented from varying during the annealing, so as to accurately measure the emissivity $\epsilon$. As a result, the annealing can be performed on the substrate while accurately controlling the annealing temperature on the basis of the measured emissivity $\epsilon$.

In the annealing method of this invention, the step of measuring emissivity $\epsilon$ may include a step of measuring reflectance r on the reverse face of the substrate for measuring the emissivity $\epsilon$ by using the measured reflectance r.

The annealing method of this invention preferably further includes, before the step of measuring the emissivity $\epsilon$, a step of removing a film of the material having been formed on the reverse face of the substrate.

Thus, the annealing of the substrate can be performed at an accurately temperature by merely adding the step of removing the film of the material that varies the emissivity ϵ having been formed on the reverse face of the substrate.

Also in this case, the annealing method may further include, before the step of removing a film of the material, a step of simultaneously forming the film of the material on the top face and the reverse face of the substrate.

In the annealing method of this invention, the heating section has a temperature gradient formed in a given region therein, and the step of performing the annealing on the substrate may include a step of controlling the annealing temperature for the substrate by controlling a position for holding the substrate within the given region with the substrate placing section.

The first method for fabricating a semiconductor device of this invention using an annealing system including a substrate placing section, a heating section for annealing a semiconductor substrate placed on the substrate placing section and a measuring section for measuring emissivity ϵ of the semiconductor substrate placed on the substrate placing section, includes the steps of forming a doped polysilicon film on at least a top face of the semiconductor substrate before placing the semiconductor substrate on the substrate placing section; measuring the emissivity ϵ on a reverse face of the semiconductor substrate with the measuring section while placing the semiconductor substrate on the substrate placing section in a state where no doped polysilicon film is formed on the reverse face of the semiconductor substrate and while annealing the semiconductor substrate with the heating section; and performing annealing on the semiconductor substrate while controlling an annealing temperature for the semiconductor substrate on the basis of the measured emissivity ϵ.

In the first method for fabricating a semiconductor device, after forming a polysilicon film doped with an impurity (hereinafter referred to as the DPS (Doped Poly-Silicon) film) at least on the top face of the semiconductor substrate, the emissivity ϵ on the reverse face of the semiconductor substrate is measured in a state where a DPS film, namely, a film of a material that varies the emissivity ϵ, is not present on the reverse face of the semiconductor substrate. Then, the annealing is performed on the semiconductor substrate while controlling the annealing temperature on the basis of the measured emissivity ϵ. Therefore, the emissivity ϵ of the semiconductor substrate can be prevented from varying during the annealing, so as to accurately measure the emissivity ϵ. As a result, the annealing can be performed on the semiconductor substrate while accurately controlling the annealing temperature on the basis of the measured emissivity ϵ. Accordingly, a semiconductor device having a planned characteristic can be fabricated.

In the first method for fabricating a semiconductor device, the step of measuring the emissivity ϵ may include a step of measuring reflectance r on the reverse face of the semiconductor substrate for measuring the emissivity ϵ by using the measured reflectance r.

In the first method for fabricating a semiconductor device, the step of forming a polysilicon film preferably includes a step of simultaneously forming the polysilicon film on the top face and the reverse face of the semiconductor substrate, and the method for fabricating a semiconductor device preferably further includes, between the step of forming a polysilicon film and the step of measuring the emissivity ϵ, a step of removing a portion of the polysilicon film having been formed on the reverse face of the semiconductor substrate.

Thus, the annealing of the semiconductor substrate can be performed at an accurate temperature by merely adding the step of removing the DPS film having been formed on the reverse face of the semiconductor substrate, so that a semiconductor device having a planned characteristic can be fabricated.

In the first method for fabricating a semiconductor device, the heating section has a temperature gradient formed in a given region therein, and the step of performing annealing on the semiconductor substrate may include a step of controlling the annealing temperature for the semiconductor substrate by controlling a position for holding the semiconductor substrate within the given region with the substrate placing section.

The second method for fabricating a semiconductor device of this invention using an annealing system including a substrate placing section, a heating section for annealing a semiconductor substrate placed on the substrate placing section and a measuring section for measuring emissivity ϵ of the semiconductor substrate placed on the substrate placing section, includes the steps of forming a doped polysilicon film in at least a memory cell forming region on a top face of the semiconductor substrate before placing the semiconductor substrate on the substrate placing section; measuring the emissivity ϵ on a reverse face of the semiconductor substrate with the measuring section while placing the semiconductor substrate on the substrate placing section in a state where no doped polysilicon film is formed on the reverse face of the semiconductor substrate and while annealing the semiconductor substrate with the heating section; and performing annealing on the semiconductor substrate while controlling an annealing temperature for the semiconductor substrate on the basis of the measured emissivity ϵ.

In the second method for fabricating a semiconductor device, the emissivity ϵ on the reverse face of the semiconductor substrate is measured after forming a DPS film at least in a memory cell forming region on the top face of the semiconductor device, and in a state where a DPS film, namely, a film of a material that varies the emissivity ϵ, is not present on the reverse face of the semiconductor substrate. Then, the annealing is performed on the semiconductor substrate while controlling the annealing temperature on the basis of the measured emissivity ϵ. Therefore, the emissivity ϵ of the semiconductor substrate can be prevented from varying during the annealing, so as to accurately measure the emissivity ϵ. As a result, the annealing can be performed on the semiconductor substrate while accurately controlling the annealing temperature on the basis of the measured emissivity ϵ. Accordingly, a memory-embedded type semiconductor device having a planned characteristic can be fabricated.

In the second method for fabricating a semiconductor device, the step of measuring the emissivity ϵ may include a step of measuring reflectance r on the reverse face of the semiconductor substrate for measuring the emissivity ϵ by using the measured reflectance r.

In the second method for fabricating a semiconductor device, the step of forming a polysilicon film preferably includes a step of simultaneously forming the polysilicon film entirely over the top face and the reverse face of the semiconductor substrate, and the method for fabricating a semiconductor device preferably further includes, between the step of forming a polysilicon film and the step of measuring the emissivity $\epsilon$, a step of removing a portion of the polysilicon film formed in a region excluding the memory cell forming region on the top face of the semiconductor substrate and a portion of the polysilicon film formed on the reverse face of the semiconductor substrate.

Thus, the annealing of the semiconductor substrate can be performed at an accurate temperature merely by adding the step of removing the DPS film having been formed on the reverse face of the semiconductor substrate, so that a semiconductor device having a planned characteristic can be fabricated. When the step of removing the DPS film having been formed on the reverse face of the semiconductor substrate is performed simultaneously with a step of removing the portion of the DPS film formed in the region excluding the memory cell forming region on the top face of the semiconductor substrate, substantial increase of the number of procedures can be avoided.

In the second method for fabricating a semiconductor device, the heating section has a temperature gradient formed in a given region therein, and the step of performing annealing on the semiconductor substrate may include a step of controlling the annealing temperature for the semiconductor substrate by controlling a position for holding the semiconductor substrate within the given region with the substrate placing section.

BEST MODE FOR CARRYING OUT THE INVENTION

Now, a method for fabricating a semiconductor device according to an embodiment of the invention will be described with reference to the drawings by exemplifying an embedded-DRAM type semiconductor device including a memory cell region and a logic region. In the following description, a principal plane of a substrate on which devices such as a transistor are formed is designated as a top face and a principal plane thereof on which devices are not formed is designated as a reverse face. In other words, devices are formed on the top face of the substrate but no devices are formed on the reverse face of the substrate.

FIGS. 1(a) through 1(c), 2(a) through 2(c), 3(a) through 3(c), 4(a), 4(b), 5(a) and 5(b) are cross-sectional views for showing procedures in the method for fabricating a semiconductor device according to this embodiment.

Figure 1:
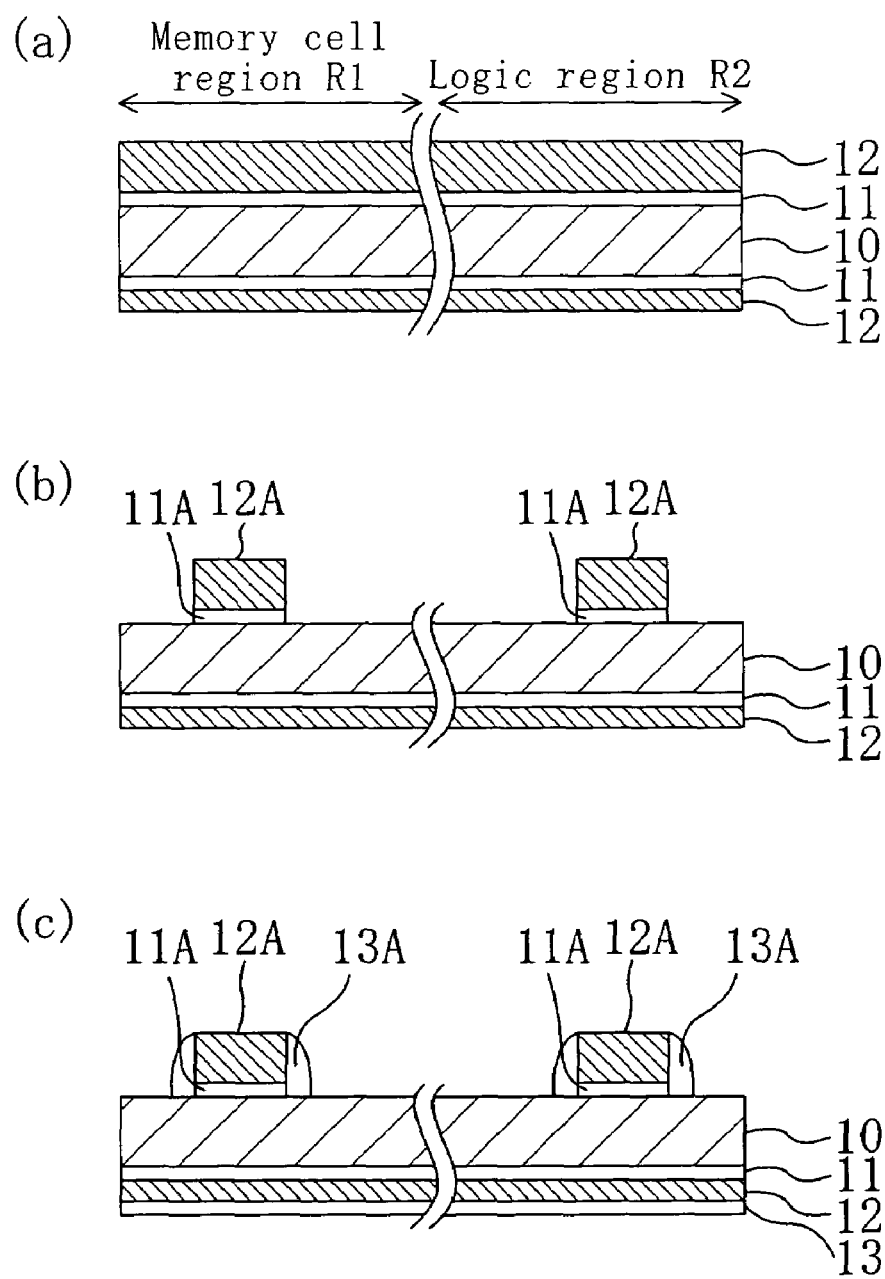
FIGS. 1(a) through 1(c) are cross-sectional views for showing procedures in a method for fabricating a semiconductor device according to an embodiment of the invention.
Figure 6:
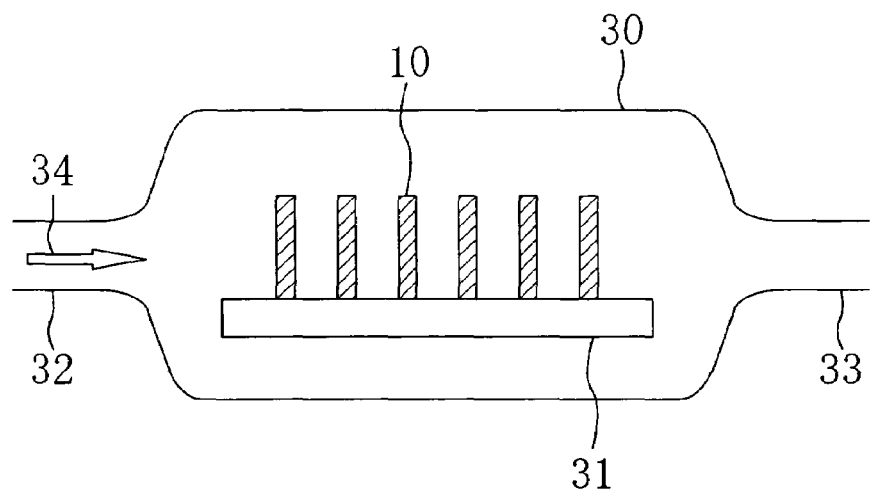
FIG. 6 is a diagram for schematically showing an example of the cross-sectional structure of a CVD system used in the method for fabricating a semiconductor device according to the embodiment of the invention.

First, as shown in FIG. 1(a), on the top face of a silicon substrate 10 having a memory cell region R1 and a logic region R2, a silicon oxide film 11 with a thickness of approximately 3 nm serving as a gate insulating film is formed by annealing. At this point, the silicon oxide film 11 is formed also on the reverse face of the silicon substrate 10. Next, the silicon substrate 10 is set in a CVD system for depositing a polysilicon film, for example, as shown in FIG. 6, so that a polysilicon (nondoped) film 12 with a thickness of approximately 200 nm to be formed into a gate electrode is deposited on the silicon oxide film 11. Specifically, as shown in FIG. 6, the silicon substrate 10 of a silicon wafer is placed on a wafer holder 31 provided within a quartz tube 30 vertically, namely, with the top and reverse faces of the silicon substrate 10 extending perpendicularly to the wafer holder 31. The quartz tube 30 has a gas inlet 32 and a gas outlet 33, and when a process gas 34, such as a $SiH_4$ gas, for forming a polysilicon film is supplied through the gas inlet 32, the polysilicon film 12 is deposited on the silicon substrate 10. At this point, since the reverse face of the silicon substrate 10 is supported on the wafer holder 31 with a small fixing member (not shown), the substrate reverse face is also exposed to the process gas 34, resulting in depositing the polysilicon film 12 also on the substrate reverse face.

Next, after the silicon substrate 10 is taken out from the CVD system, the polysilicon film 12 deposited on the substrate top face is etched, thereby forming gate electrodes 12A from the polysilicon film 12 and gate insulating films 11A from the silicon oxide film 11 respectively in the memory cell region R1 and the logic region R2 on the top face of the silicon substrate 10 as shown in FIG. 1(b). At this point, the polysilicon film 12 remains to entirely cover the substrate reverse face. Next, ion implantation is performed on the top face of the silicon substrate 10 by using the gate electrodes 12A used as a mask, thereby forming impurity diffusion layers (not shown) serving as extension regions for transistors. At this point, the ion implantation is not performed on the reverse face of the silicon substrate 10.

Next, the silicon substrate 10 is set in, for example, a CVD system similar to that of FIG. 6, so as to deposit a TEOS oxide film ($SiO_2$ film) 13 with a thickness of approximately 20 nm over the entire top face of the silicon substrate 10. At this point, the TEOS oxide film 13 is deposited also on the substrate reverse face. Thereafter, after taking out the silicon substrate 10 from the CVD system, the TEOS oxide film 13 deposited on the substrate top face is etched back, thereby forming side walls 13A from the TEOS oxide film 13 on the side faces of the gate electrodes 12A as shown in FIG. 1(c). Next, the ion implantation is performed on the top face of the silicon substrate 10 by using the gate electrodes 12A and the side walls 13A used as a mask, thereby forming impurity diffusion layers (not shown) serving as source/drain regions of the transistors. In this manner, a memory cell transistor including the gate electrode 12A and the like is formed in the memory cell region R1, and a logic transistor including the gate electrode 12A and the like is formed in the logic region R2. The ion implantation is not performed on the reverse face of the silicon substrate 10.

Figure 2:
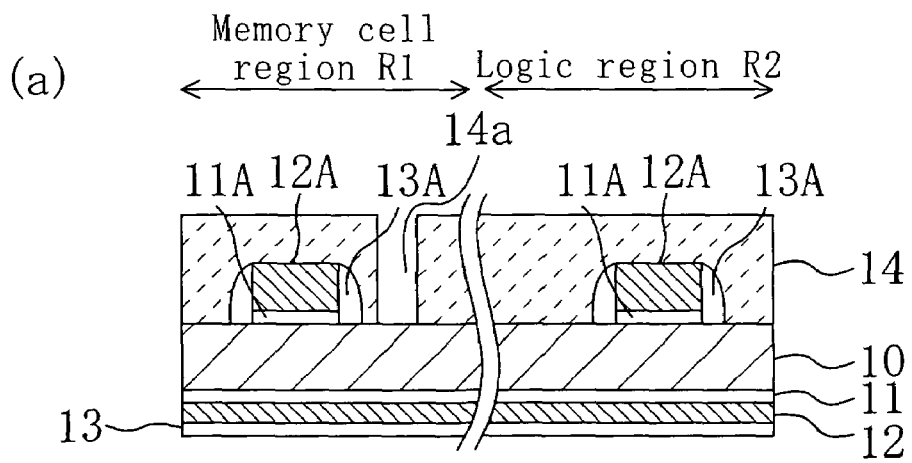
FIGS. 2(a) through 2(c) are cross-sectional views for showing procedures in the method for fabricating a semiconductor device according to the embodiment of the invention.
Figure 2:
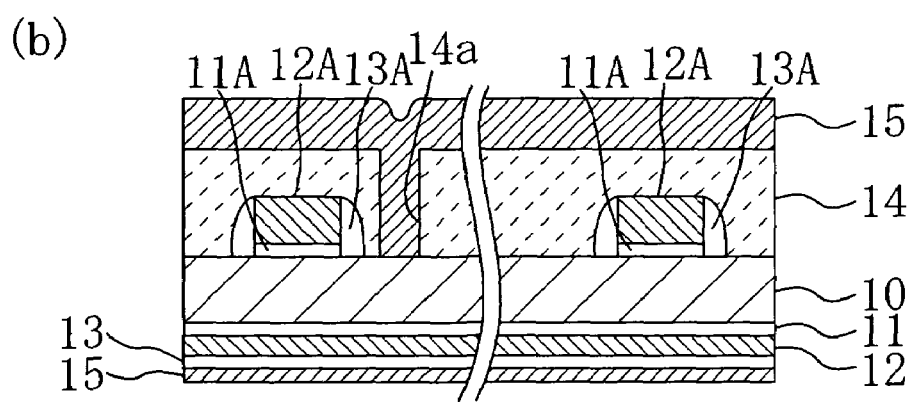
Figure 2:
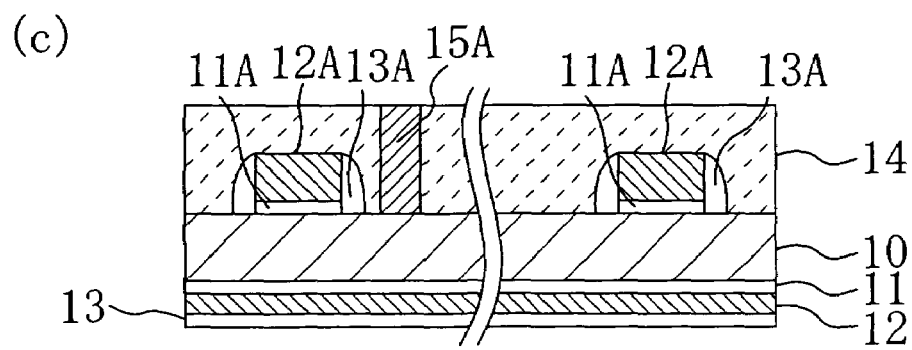
Figure 7:
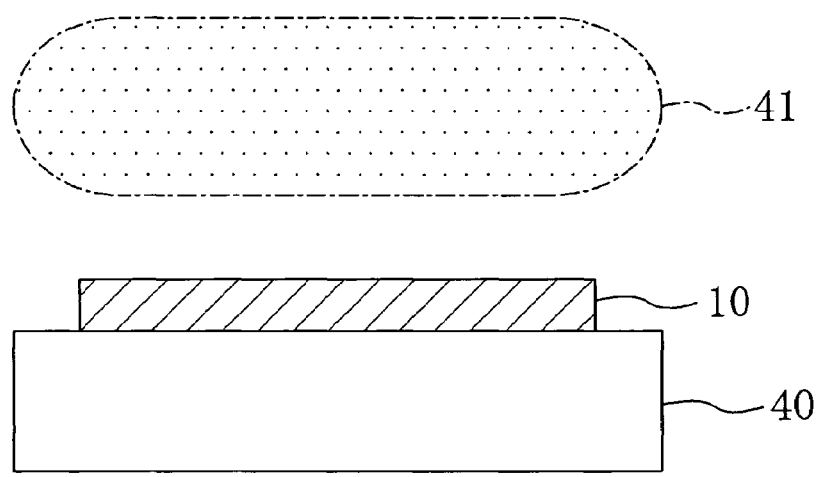
FIG. 7 is a diagram for schematically showing an example of the cross-sectional structure of a plasma CVD system used in the method for fabricating a semiconductor device according to the embodiment of the invention.

Next, the silicon substrate 10 is set in a plasma CVD system for depositing a silicon oxide film, for example, as shown in FIG. 7, so as to form a planarized film 14 of a silicon oxide film with a thickness of approximately 500 nm over the entire top face of the silicon substrate 10 as shown in FIG. 2(a). Specifically, as shown in FIG. 7, the silicon substrate 10 of a silicon wafer is placed on a wafer holder 40 of the plasma CVD system laterally, namely, with the reverse face of the silicon substrate 10 in contact with the wafer holder 40. Then, when the top face of the silicon substrate 10 is exposed to plasma 41 made of a gas including, for example, $SiH_4$, $N_2O$, $PH_3$ and $B_2H_6$, the silicon oxide film serving as the planarized film 14 is formed. At this point, the reverse face of the silicon substrate 10 is not exposed to the plasma 41, and hence, no silicon oxide film is deposited on the substrate reverse face.

In the subsequent procedures, a memory cell is formed in the memory cell region R1 alone. In other words, no memory cell is formed in the logic region R2. Specifically, after taking out the silicon substrate 10 from the plasma CVD system, a contact hole 14a reaching a predetermined portion in the memory cell region R1 of the silicon substrate 10 (the source/drain region of the memory cell transistor) is first formed in the planarized film 14 as shown in FIG. 2(a).

Next, the silicon substrate 10 is set in, for example, a CVD system similar to that of FIG. 6, and for example, a $SiH_4$ gas and a $PH_3$ gas are used as the process gas, so as to deposit a phosphorus-doped polysilicon film (first DPS film) 15 with a thickness of approximately 250 nm over the entire top face of the silicon substrate 10 including the contact hole 14a as shown in FIG. 2(b). At this point, the first DPS film 15 is deposited also on the substrate reverse face.

Next, after taking out the silicon substrate 10 from the CVD system, a portion of the first DPS film 15 deposited on the substrate top face outside the contact hole 14a is removed by etching, thereby forming a plug 15A from the first DPS film 15 as shown in FIG. 2(c). At this point, the first DPS film 15 deposited on the substrate reverse face is also removed simultaneously with or at different timing from the unnecessary portion of the first DPS film 15 deposited on the substrate top face. For example, after forming the plug 15A with allowing the first DPS film 15 deposited on the substrate reverse face to remain, the first DPS film 15 deposited on the substrate reverse face may be removed by wet etching with the substrate top face covered with a resist film. Thus, a film that varies the emissivity $\epsilon$ of the silicon substrate 10 is removed.

Figure 3:
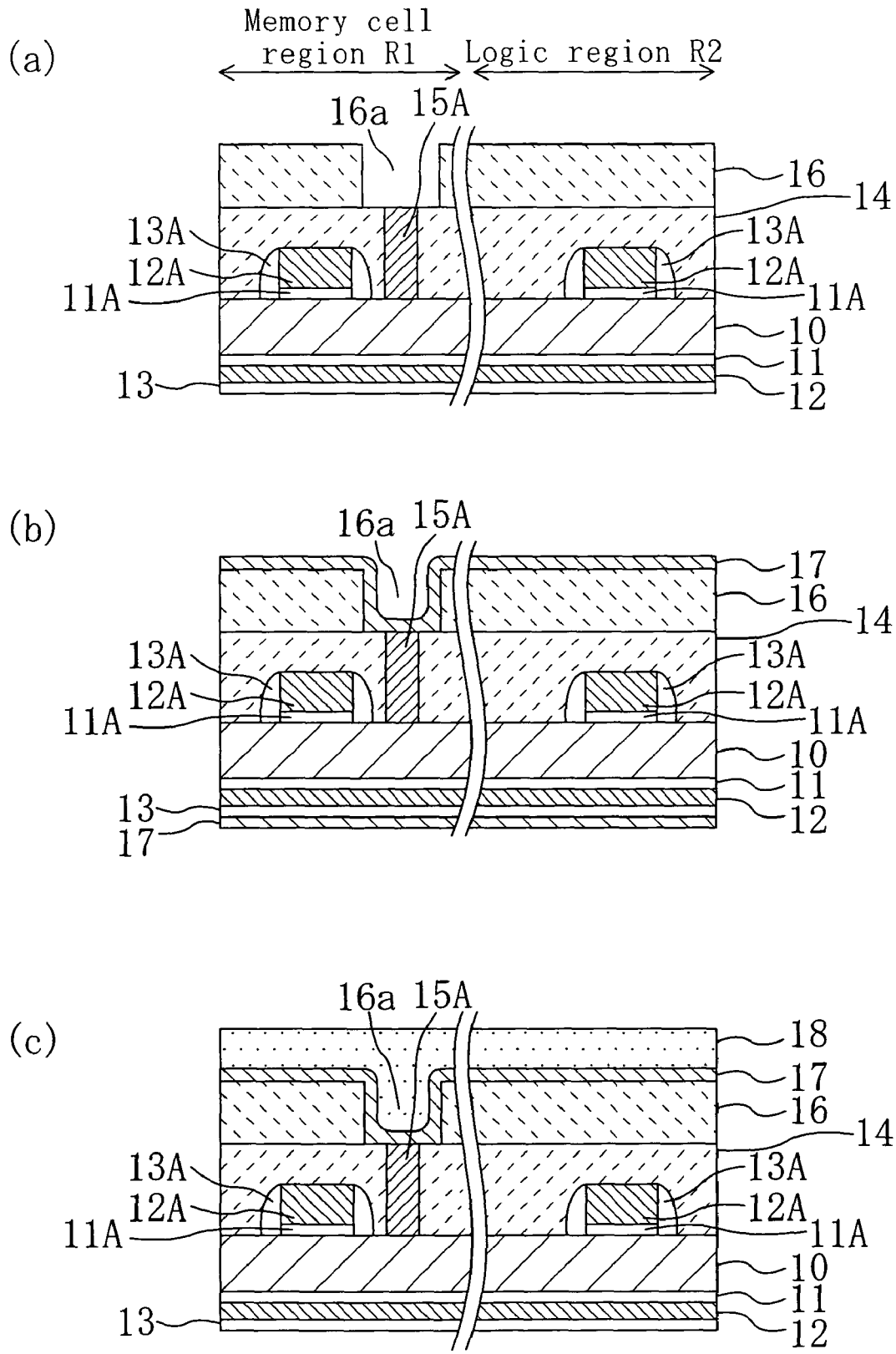
FIGS. 3(a) through 3(c) are cross-sectional views for showing procedures in the method for fabricating a semiconductor device according to the embodiment of the invention.

Next, the silicon substrate 10 is set in, for example, a plasma CVD system similar to that of FIG. 7, so as to deposit a BPSG (boro-phospho silicate glass) film 16 with a thickness of approximately 500 nm over the entire top face of the silicon substrate 10 as shown in FIG. 3(a). At this point, the BPSG film 16 is not deposited on the substrate reverse face. Thereafter, an opening 16a is formed in the BPSG film 16 so as to expose the plug 15A formed in the memory cell region R1.

Next, after taking out the silicon substrate 10 from the plasma CVD system, the silicon substrate 10 is set in, for example, a CVD system similar to that of FIG. 6, and for example, a $SiH_4$ gas and a $PH_3$ gas are used as the process gas. Thus, as shown in FIG. 3(b), a phosphorus-doped polysilicon film (second DPS film) 17 with a thickness of approximately 100 nm is deposited over the entire top face of the silicon substrate 10 so as to fill the opening 16a halfway. At this point, the second DPS film 17 is deposited also on the substrate reverse face.

Figure 4:
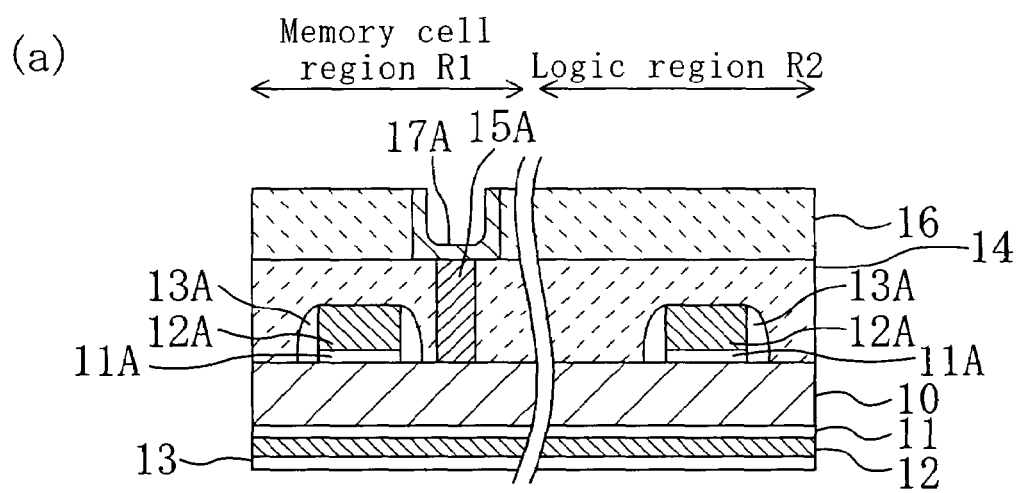
FIGS. 4(a) and 4(b) are cross-sectional views for showing procedures in the method for fabricating a semiconductor device according to the embodiment of the invention.
Figure 4:
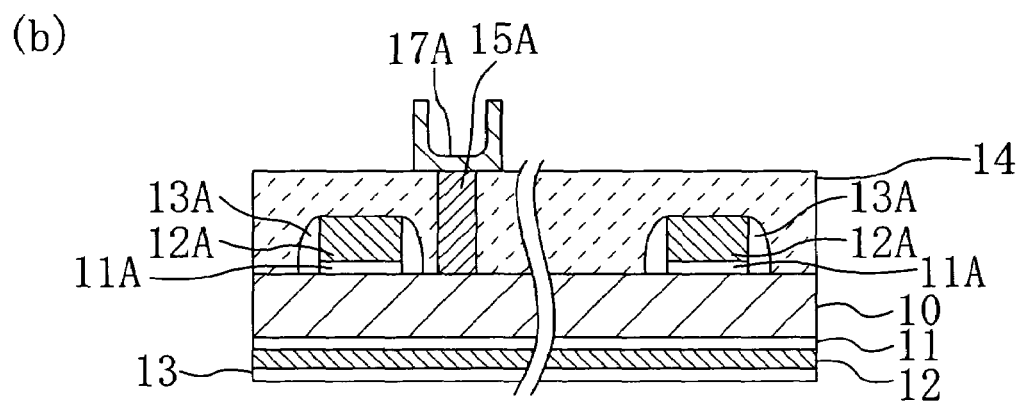

Next, after taking out the silicon substrate 10 from the CVD system, a resist film 18 is formed over the entire tope face of the silicon substrate 10 as shown in FIG. 3(c), and while covering the second DPS film 17 deposited on the substrate top face with the resist film 18, the second DPS film 17 deposited on the substrate reverse face is removed by the wet etching. Thus, a film that varies the emissivity $\epsilon$ of the silicon substrate 10 is removed. Thereafter, as shown in FIG. 4(a), a portion of the second DPS film 17 deposited on the substrate top face outside the opening 16a is removed by the etching. Thus, a capacitor lower electrode 17A connected to the plug 15A is formed from the portion of the second DPS film 17 remaining on the wall and the bottom of the opening 16a.

Figure 5:
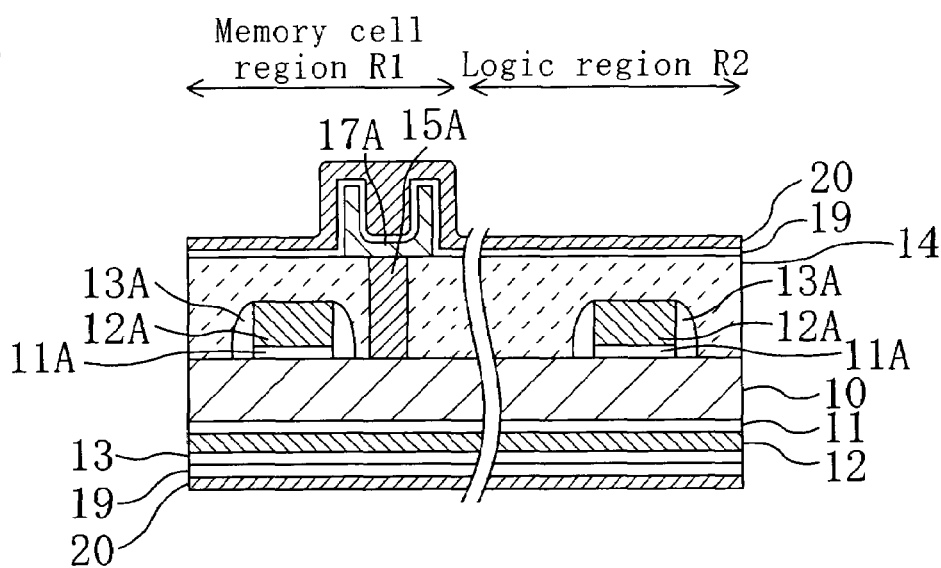
FIGS. 5(a) and 5(b) are cross-sectional views for showing procedures in the method for fabricating a semiconductor device according to the embodiment of the invention.
Figure 5:
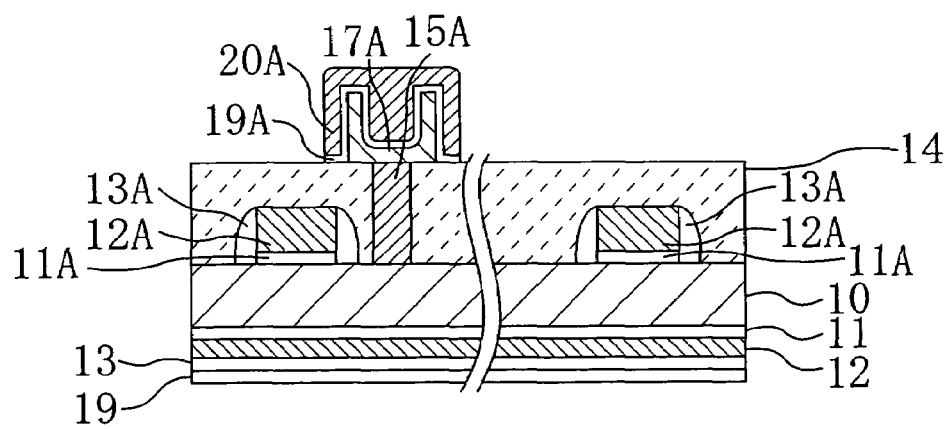

Next, as shown in FIG. 4(b), after removing the BPSG film 16, for example, a CVD system similar to that of FIG. 6 is used, so that a silicon nitride film (SiN film) 19 with a thickness of approximately 50 nm to be formed into a capacitor dielectric film and a phosphorus-doped polysilicon film (third DPS film) 20 with a thickness of approximately 100 nm to be formed into a capacitor upper electrode (plate electrode) can be successively deposited over the entire top face of the silicon substrate 10 as shown in FIG. 5(a). At this point, the SiN film 19 and the third DPS film 20 are deposited also on the substrate reverse face.

Next, after taking out the silicon substrate 10 from the CVD system, the SiN film 19 and the third DPS film 20 deposited on the substrate top face are patterned by the etching as shown in FIG. 5(b). Thus, a capacitor upper electrode 20A made from the third DPS film 20 is formed above the capacitor lower electrode 17A with a capacitor dielectric film 19A made from the SiN film 19 sandwiched therebetween. At this point, the third DPS film 20 deposited on the substrate reverse face is also removed simultaneously or at different timing from the unnecessary portion of the third DPS film 20 deposited on the substrate top face. For example, after forming the capacitor upper electrode 20A with allowing the third DPS film 20 deposited on the substrate reverse face to remain, the third DPS film 20 deposited on the substrate reverse face may be removed by the wet etching with the substrate top face covered with a resist film. Thus, a film that varies the emissivity $\epsilon$ of the silicon substrate 10 is removed.

Through the aforementioned procedures, a memory cell provided with the transistor including the gate electrode 12A and the like and a capacitor including the capacitor lower electrode 17A, the capacitor dielectric film 19A and the capacitor upper electrode 20A is formed in the memory cell region R1 on the substrate top face, and the logic transistor including the gate electrode 12A and the like is formed in the logic region R2 on the substrate top face. Also, after completing the aforementioned procedures, the semiconductor device under fabrication has a film structure free from a DPS film present on the substrate reverse face (namely, the plane on which the emissivity $\epsilon$ is to be measured).

Figure 9:
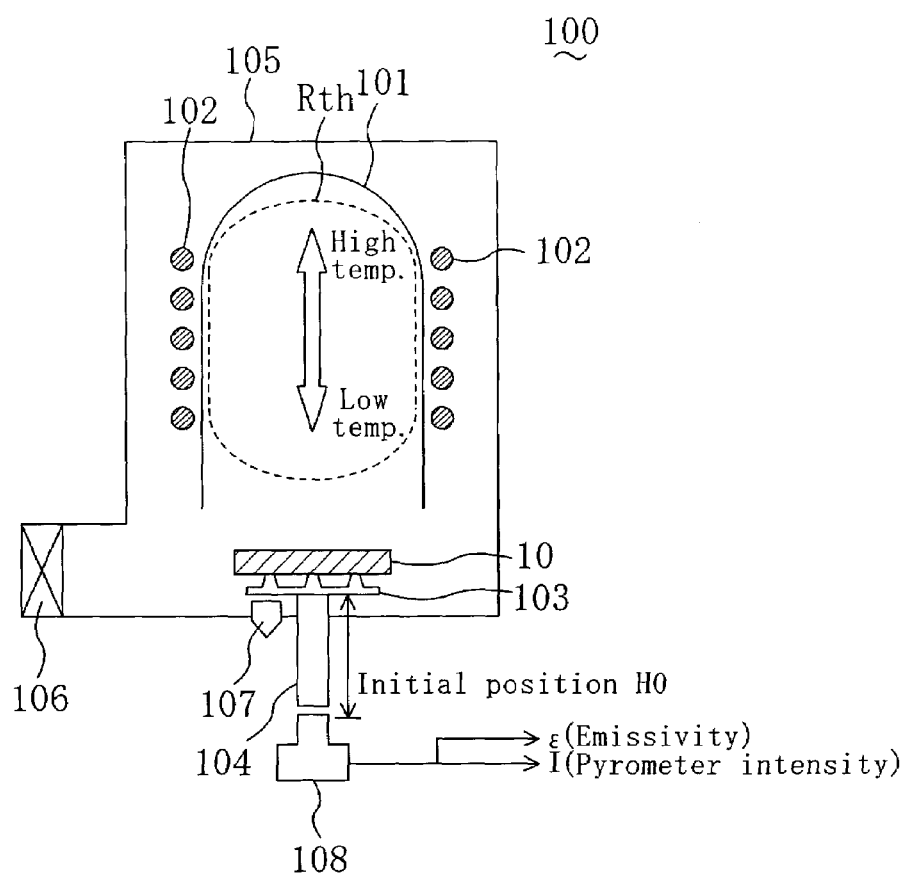
FIG. 9 is a diagram for schematically showing the cross-sectional structure of a general hot wall type annealing system used in the method for fabricating a semiconductor device according to the embodiment of the invention.
Figure 10:
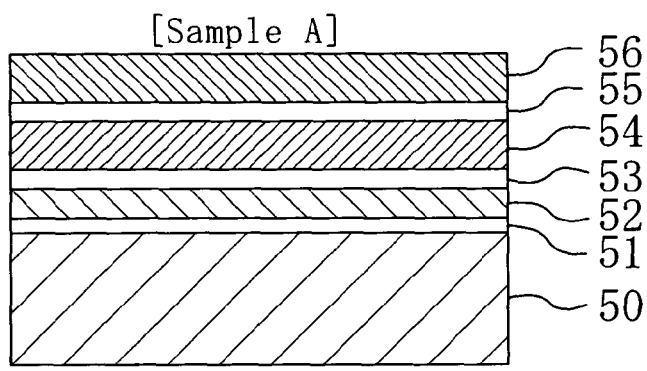
FIG. 10(a) is a table for showing the film structures (the materials and the thicknesses of respective films) of samples A, B and C used in comparative experiments performed by the present inventors for measuring the emissivity $\epsilon$.
FIG. 10(b) is a cross-sectional view of the sample A.
FIG. 10(c) is a cross-sectional view of the sample B and FIG. 10(d) is a cross-sectional view of the sample C.
Figure 10:
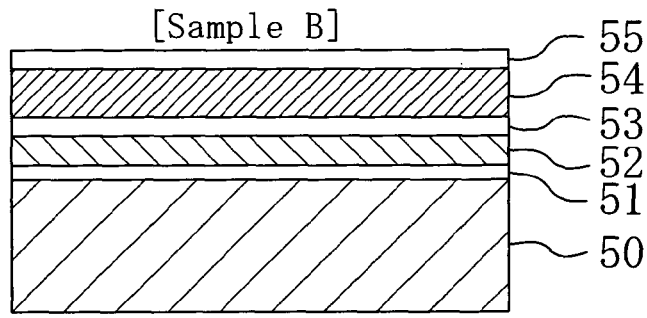
Figure 10:
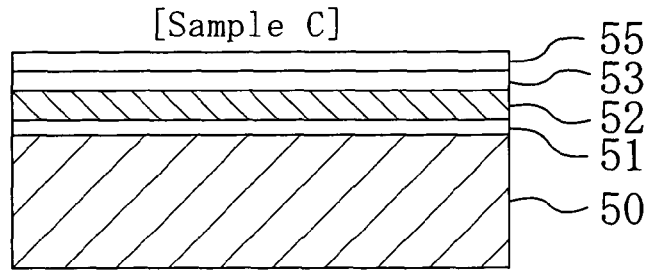
Figure 11:
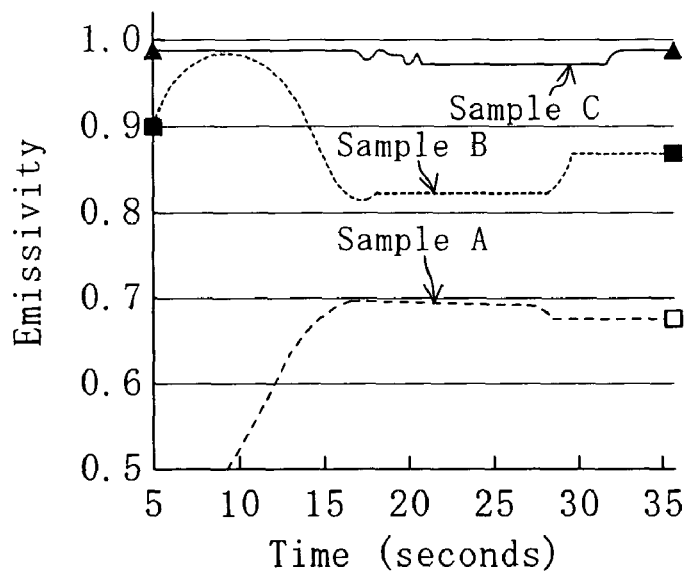
FIG. 11(a) is a diagram for showing relationships between the annealing time and the emissivity $\epsilon$ obtained with respect to the samples A, B and C.
FIG. 11(b) is a diagram for showing relationships between the annealing time and the emissivity $\epsilon$ obtained with respect to a plurality of samples B (samples B1, B2, B3, B4 and B5).
Figure 11:
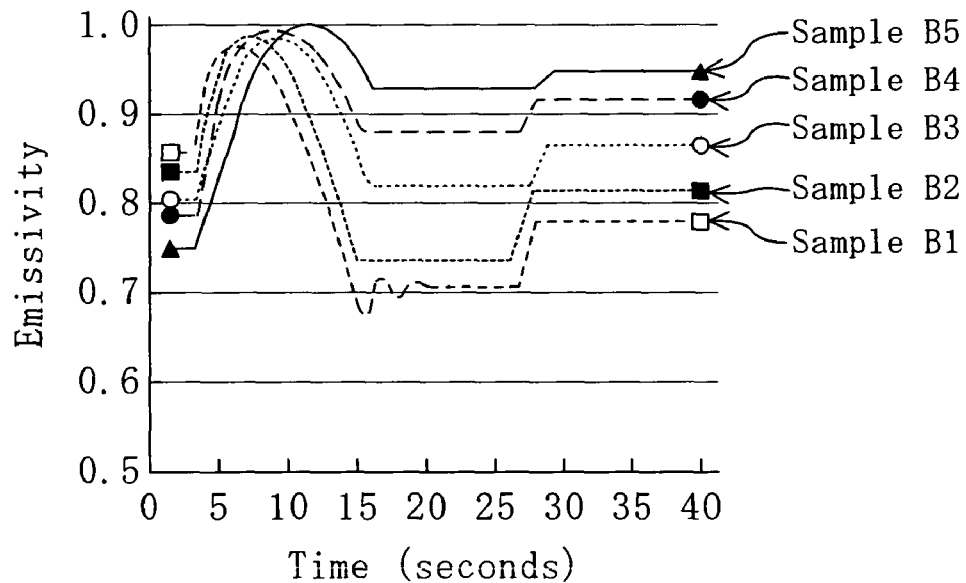

Next, the silicon substrate 10 in which the memory cell and the logic transistor have been formed (hereinafter simply referred to as the substrate 10) is subjected to annealing. Specifically, a general annealing system, such as the hot wall type annealing system 100 shown in FIG. 9, is used for performing the annealing for activating an impurity included in the source/drain regions of the transistors formed on the substrate 10. At this point, the emissivity $\epsilon$ of the substrate 10 is measured by irradiating the reverse face of the substrate 10 being annealed with measuring light of a predetermined wavelength, and while monitoring the temperature T of the substrate 10 on the basis of the measured emissivity $\epsilon$, the substrate 10 is held in a position corresponding to a desired temperature (of, for example, 1000° C.) within the thermal region Rth (shown in FIG. 9) for performing the annealing for, for example, 10 seconds. Also, as shown in FIG. 9, the substrate 10 is inserted into the cover 105 of the annealing system 100 through the substrate inlet/outlet 106 to be placed on the table 103. Furthermore, the substrate 10 is held in a desired position in the thermal region Rth within the furnace 101 formed by using the coil 102 by vertically moving the table 103 with the support 104. Additionally, the photoirradiation section 107 provided in the lower portion of the annealing system 100 irradiates the reverse face of the substrate 10 with light of a wavelength $\lambda$ of, for example, 950 nm, and the emissivity $\epsilon$ and the pyrometer intensity I on the reverse face of the substrate 10 are measured with the measuring section 108 provided below the support 104, so that the temperature T of the substrate 10 can be monitored on the basis of the measurement result.

Figure 8:
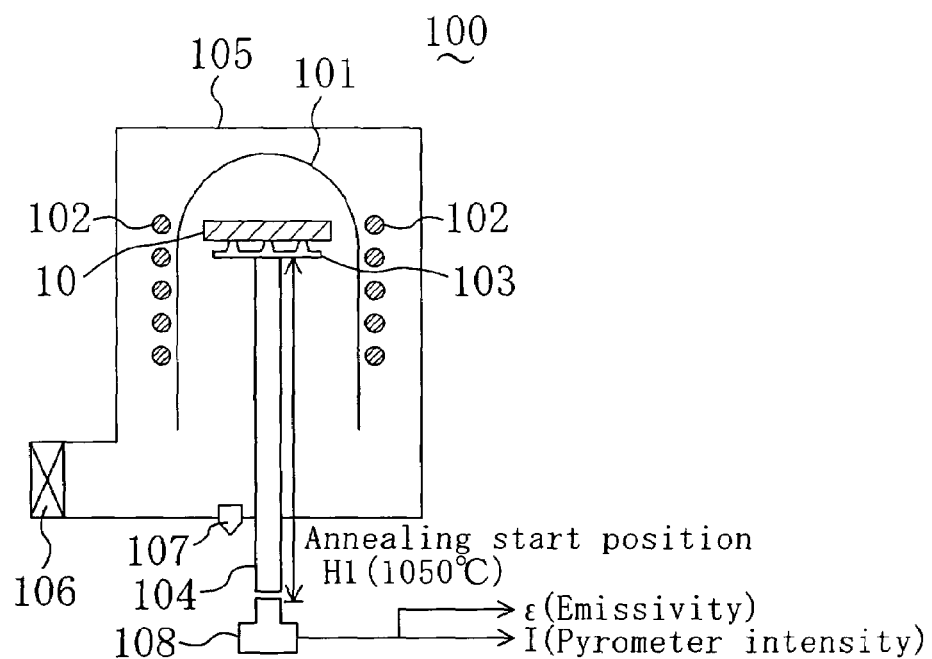
FIGS. 8(a) and 8(b) are diagrams for schematically showing the inside states of an annealing system performing annealing in the method for fabricating a semiconductor device according to the embodiment of the invention.
Figure 8:
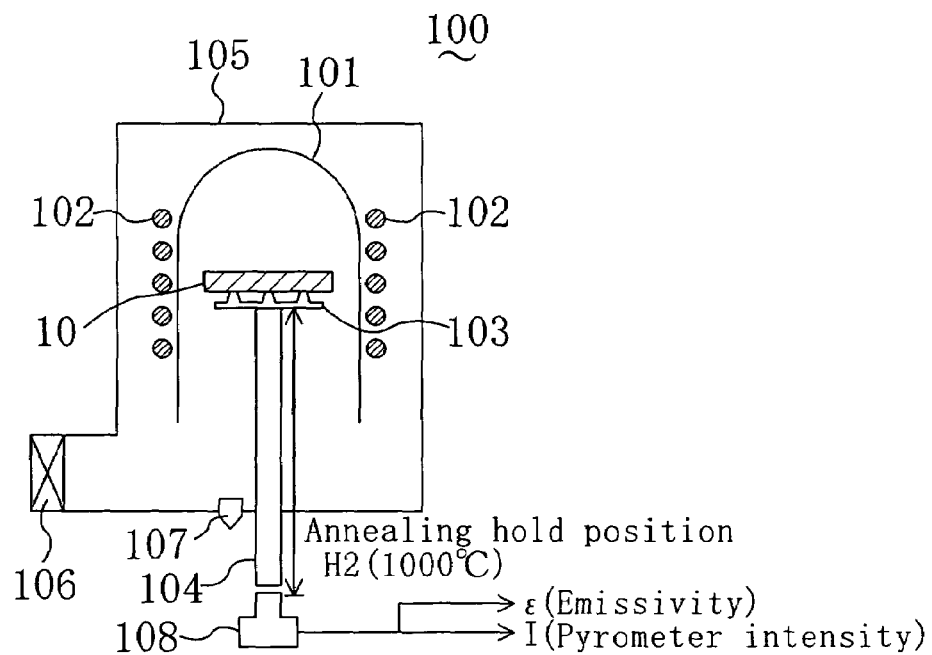

FIGS. 8(a) and 8(b) schematically show the inside states of the annealing system during the annealing performed in the method for fabricating a semiconductor device of this embodiment.

First, as shown in FIG. 8(a), when the annealing of the substrate 10 is started, the substrate 10 together with the table 103 is elevated by using the support 104 from the initial position H0 (shown in FIG. 9) to an annealing start position H1 (the corresponding annealing temperature: 1050° C.). Thereafter, while holding the substrate 10 in the annealing start position H1 for a while, the temperature T of the substrate 10 is monitored.

Next, when the monitored temperature T is increased close to 1000° C., as shown in FIG. 8(b), the substrate 10 is lowered by using the support 104 from the annealing start position H1 (shown in FIG. 8(a)) to an annealing hold position H2 (the corresponding annealing temperature: 1000° C.). Thereafter, the substrate 10 is held in the annealing hold position H2 for 10 seconds, thereby annealing the substrate 10 at 1000° C. for 10 seconds. During this annealing, by measuring the emissivity $\epsilon$ on the reverse face of the substrate 10 and monitoring the temperature T of the substrate 10 on the basis of the measured emissivity $\epsilon$, the position for holding the substrate 10 is feedback controlled so as to keep the temperature T at 1000° C.

After completing the annealing of the substrate 10, the substrate 10 is lowered by using the support 104 from the annealing hold position H2 to the initial position H0. Thereafter, the substrate 10 is naturally cooled, and then, the substrate 10 is taken out from the annealing system 100 through the substrate inlet/outlet 106.

The description of subsequent procedures of this embodiment is omitted, and this embodiment attains the following effects: In the annealing processing for the substrate 10 (specifically, the annealing processing for activating the impurity included in the source/drain regions of the transistors), when the emissivity $\epsilon$ on the reverse face of the substrate 10 is measured, the films made from materials that vary the emissivity $\epsilon$, such as the first DPS film 15 used for forming the plug 15A, the second DPS film 17 used for forming the capacitor lower electrode 17A and the third DPS film 20 used for forming the capacitor upper electrode 20A, are formed on the top face of the substrate 10. On the other hand, a film that varies the emissivity $\epsilon$, such as a DPS film, is not formed on the reverse face of the substrate 10. Therefore, the emissivity $\epsilon$ can be prevented from varying during the annealing of the substrate 10, and hence, the emissivity $\epsilon$ can be accurately measured. As a result, on the basis of the measured emissivity $\epsilon$, for example, by substituting the measured value of the emissivity $\epsilon$ in the temperature measurement function (see formula 3), the temperature of the substrate 10 being annealed can be accurately obtained. Accordingly, the annealing can be performed on the substrate 10 while accurately controlling the annealing temperature for the substrate 10, and therefore, a semiconductor device including a transistor that exhibits a planned characteristic can be fabricated.

Also in this embodiment, each of the DPS films formed on the substrate reverse face respectively simultaneously with the first DPS film 15, the second DPS film 17 and the third DPS film 20 formed on the top face of the substrate 10 is removed every time it is formed. More specifically, the first DPS film 15 used for forming the plug 15A, the second DPS film 17 used for forming the capacitor lower electrode 17A and the third DPS film 20 used for forming the capacitor upper electrode 20A are first respectively formed in the memory cell region R1 on the top face of the substrate 10. Thereafter, the unnecessary portion of each DPS film formed on the substrate top face (i.e., each DPS film formed in a region other than the memory cell region R1 on the substrate top face) is removed and each DPS film formed on the substrate reverse face is removed, and thereafter, the annealing is performed on the substrate 10 while measuring the emissivity $\epsilon$ of the substrate 10. Specifically, the emissivity $\epsilon$ can be accurately measured merely by additionally performing the procedures for removing the DPS films formed on the reverse face of the substrate 10, so that the annealing can be performed on the substrate 10 at an accurate temperature. Therefore, an embedded-DRAM type semiconductor device with a planned characteristic can be fabricated.

Although merely the DPS films (the first DPS film 15, the second DPS film 17 and the third DPS film 20) formed on the reverse face of the substrate 10 are removed in this embodiment, the silicon oxide film 11, the polysilicon (nondoped) film 12, the TEOS oxide film 13 or the SiN film 19 may be removed from the substrate reverse face in addition to the DPS films. Also, each DPS film may be a polysilicon film doped with an impurity other than phosphorus.

Furthermore, in this embodiment, when the first DPS film 15, the second DPS film 17 and the third DPS film 20 are formed on the top face of the substrate 10, the respective DPS films are formed also on the substrate reverse face. Instead, a system similar to, for example, that of FIG. 7 may be used for depositing the DPS films, namely, the DPS films may be deposited by using a CVD system in which the substrate reverse face is in contact with the wafer holder, so as not to form the DPS films on the substrate reverse face. Thus, the procedures for removing the respective DPS films formed on the substrate reverse face can be omitted. However, even in the case where a DPS film is formed on the substrate reverse face, substantial increase of the number of procedures can be avoided by removing the DPS film formed on the substrate reverse face simultaneously with the unnecessary portion of the DPS film formed on the substrate top face.

Also in this embodiment, before forming the capacitor including the capacitor lower electrode 17A, the capacitor dielectric film 19A and the capacitor upper electrode 20A, the ion implantation is performed on the substrate 10 for forming the source/drain regions of the transistor including the gate electrode 12A and the like. Instead, the source/drain regions may be formed, after forming the capacitor, by performing the ion implantation on the substrate 10 with partly opening, for example, the planarized film 14.

Moreover, in this embodiment, the annealing for activating the impurity included in the source/drain regions is performed with the DPS films formed on the top face of the substrate 10 and with no DPS film formed on the reverse face of the substrate 10 that is irradiated with light for measuring the emissivity $\epsilon$. This does not limit the invention but the same effects as those of this embodiment can be attained when any annealing is performed with a film made from a material that varies the emissivity $\epsilon$ formed on the top face of the substrate 10 and with no film made from a material that varies the emissivity $\epsilon$ formed on the reverse face of the substrate 10 corresponding to the plane irradiated with the measuring light.

Furthermore, the hot wall type annealing system as shown in FIG. 9, specifically, an annealing system in which the temperature gradient is formed in the thermal region Rth and the substrate annealing temperature is controlled by adjusting a substrate hold position in the thermal region Rth, is used in this embodiment. However, an annealing system usable in this embodiment is not particularly specified as far as it includes a substrate placing section, a heating section for annealing a substrate placed on the substrate placing section and a measuring section for measuring the emissivity $\epsilon$ on the reverse face of the substrate placed on the substrate placing section.

In addition, subjects of this embodiment are the annealing performed on a substrate during the fabrication of a semiconductor device and the measurement of the emissivity $\epsilon$ and the temperature T of the substrate during the annealing. However, this does not limit the invention but it goes without saying that the subject may be annealing performed on any of a variety of objects or the measurement of the emissivity $\epsilon$ or the temperature T of the object.

Moreover, although the emissivity $\epsilon$ on the reverse face of the substrate 10 is directly measured in this embodiment, the reflectance r on the reverse face of the substrate 10 may be measured instead so as to indirectly measure the emissivity $\epsilon$ by using the measured reflectance r. This is because the emissivity $\epsilon$ may be obtained on the basis of the relationship formula, $\epsilon=1-r$.

The invention claimed is:

1. A method for measuring a temperature comprising the steps of:
   forming a doped polysilicon film on a top face and a reverse face of a substrate:
   removing a portion of said doped polysilicon film having been formed on said reverse face of said substrate;
   measuring emissivity $\epsilon$ on said reverse face of said substrate in a state where no doped polysilicon film is formed on said reverse face of said substrate while annealing said substrate; and
   calculating a temperature of said substrate being annealed on the basis of said measured emissivity $\epsilon$.

2. The method for measuring a temperature of claim 1, wherein the step of measuring emissivity $\epsilon$ includes a step of measuring reflectance r on said reverse face of said substrate for measuring said emissivity $\epsilon$ by using said measured reflectance r.

3. An annealing method for performing annealing on a substrate by using an annealing system including a substrate placing section, a heating section for annealing said substrate placed on said substrate placing section and a measuring section for measuring emissivity $\epsilon$ of said substrate placed on said substrate placing section, comprising the steps of:
   forming a doped polysilicon film on a top face and a reverse face of said substrate;
   removing a portion of said doped polysilicon film having been formed on said reverse face of said substrate;
   measuring said emissivity $\epsilon$ on said reverse face of said substrate in a state where no doped polysilicon film is formed on said reverse face of said substrate while annealing said substrate; and
   performing the annealing on said substrate while controlling an annealing temperature for said substrate on the basis of said measured emissivity $\epsilon$.

4. The annealing method of claim 3, wherein the step of measuring emissivity $\epsilon$ includes a step of measuring reflectance r on said reverse face of said substrate for measuring said emissivity $\epsilon$ by using said measured reflectance r.

5. The annealing method of claim 3, wherein said doped polysilicon film is simultaneously formed on said top face and said reverse face of said substrate.

6. The annealing method of claim 3, wherein said heating section has a temperature gradient formed in a given region therein, and the step of performing the annealing on said substrate includes a step of controlling said annealing temperature for said substrate by controlling a position for holding said substrate within said given region with said substrate placing section.

7. A method for fabricating a semiconductor device using an annealing system including a substrate placing section, a heating section for annealing a substrate placed on said substrate placing section and a measuring section for measuring emissivity $\epsilon$ of said substrate placed on said substrate placing section, comprising the steps of:
   forming a doped polysilicon film on a top face and a reverse face of said substrate before placing said substrate on said substrate placing section;
   removing a portion of said doped polysilicon film having been formed on said reverse face of said substrate before placing said substrate on said substrate placing section;
   measuring said emissivity $\epsilon$ on a reverse face of said substrate with said measuring section while placing said substrate on said substrate placing section in a state where no doped polysilicon film is formed on said reverse face of said substrate while annealing said substrate with said heating section; and
   performing the annealing on said substrate while controlling an annealing temperature for said substrate on the basis of said measured emissivity $\epsilon$.

8. The method for fabricating a semiconductor device of claim 7,
wherein the step of measuring said emissivity $\epsilon$ includes a step of measuring reflectance r on said reverse face of said substrate for measuring said emissivity $\epsilon$ by using said measured reflectance r.

9. The method for fabricating a semiconductor device of claim 7,
wherein said doped polysilicon film is simultaneously formed on said top face and said reverse face of said substrate.

10. The method for fabricating a semiconductor device of claim 7,
wherein said heating section has a temperature gradient formed in a given region therein, and
the step of performing annealing on said substrate includes a step of controlling said annealing temperature for said substrate by controlling a position for holding said substrate within said given region with said substrate placing section.

11. A method for fabricating a semiconductor device using an annealing system including a substrate placing section, a heating section for annealing a substrate placed on said substrate placing section and a measuring section for measuring emissivity $\epsilon$ of said semiconductor substrate placed on said substrate placing section, comprising the steps of:
forming a doped polysilicon film in at least a memory cell region on a top face and a reverse face of said substrate before placing said substrate on said substrate placing section;
removing a portion of said doped polysilicon film having been formed on said reverse face of said substrate before placing said substrate on said substrate placing section;
measuring said emissivity $\epsilon$ on said reverse face of said substrate with said measuring section while placing said substrate on said substrate placing section in a state where no doped polysilicon film is formed on said reverse face of said substrate while annealing said substrate with said heating section; and
performing the annealing on said substrate while controlling an annealing temperature for said substrate on the basis of said measured emissivity $\epsilon$.

12. The method for fabricating a semiconductor device of claim 11,
wherein the step of measuring said emissivity $\epsilon$ includes a step of measuring reflectance r on said reverse face of said substrate for measuring said emissivity $\epsilon$ by using said measured reflectance r.

13. The method for fabricating a semiconductor device of claim 11,
wherein said doped polysilicon film is simultaneously formed on said top face and said reverse face of said substrate.

14. The method for fabricating a semiconductor device of claim 11,
wherein said heating section has a temperature gradient formed in a given region therein, and
the step of performing annealing on said substrate includes a step of controlling said annealing temperature for said substrate by controlling a position for holding said substrate within said given region with said substrate placing section.

* * * * *